United States Patent [19]

Buehler

[11] 4,250,986
[45] Feb. 17, 1981

[54] GRAIN CHUTE

[76] Inventor: Howard D. Buehler, 1001 W. County Rd. 2E, Berthoud, Colo. 80513

[21] Appl. No.: 964,689

[22] Filed: Nov. 29, 1978

[51] Int. Cl.³ .............................................. B65G 11/00
[52] U.S. Cl. .......................................... 193/5; 193/17
[58] Field of Search ...................... 193/5, 9, 3, 4, 2 R, 193/2 A, 2 D, 17; 296/50, 51, 52; 222/462; 105/280, 281

[56] References Cited
U.S. PATENT DOCUMENTS

| 956,078 | 4/1910 | Greenfield | 193/5 |
|---|---|---|---|
| 1,120,734 | 12/1914 | Morling | 193/17 |
| 1,798,711 | 3/1931 | States | 193/2 R |
| 2,727,614 | 12/1955 | Bauer | 193/2 R |
| 4,058,239 | 11/1977 | Van Mill | 193/17 |

Primary Examiner—Robert B. Reeves
Assistant Examiner—Gene A. Church
Attorney, Agent, or Firm—Young & Martin

[57] ABSTRACT

A removable grain chute is provided with an integral unitary attachment member adapted for removably attaching the chute to the bottom edge of a truck body or box. The attachment member includes an upwardly turned lip at the end of a rigid extension of the chute which is adapted to engage the side frame of the truck body and the bottom edge of the sideboard for supporting the chute in position under the grain gate of the truck body.

2 Claims, 5 Drawing Figures

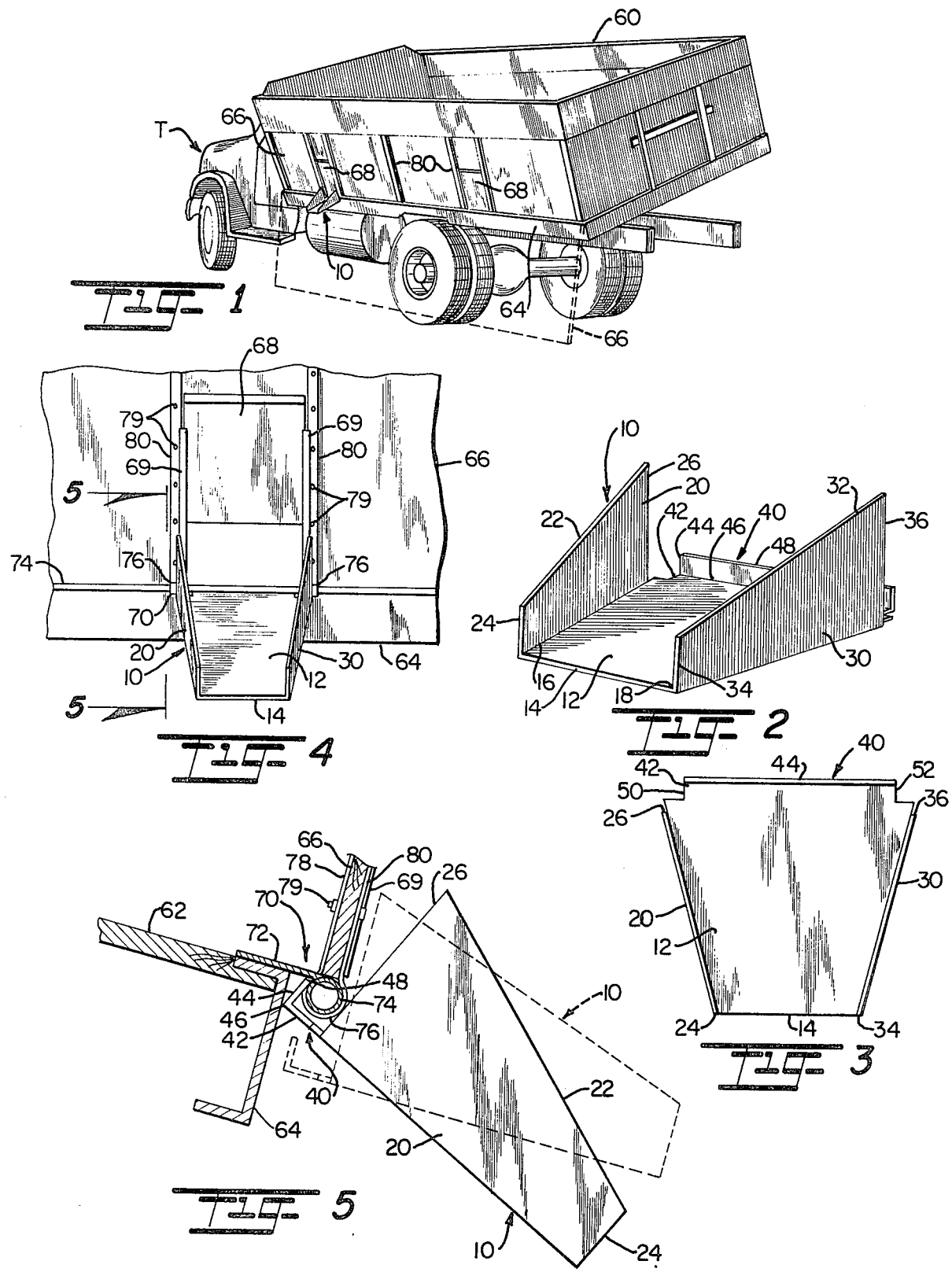

GRAIN CHUTE

BACKGROUND OF THE INVENTION

The present invention generally concerns grain chute devices and more particularly a portable grain chute adapted to be removably attached to a truck body under the grain gate in the side wall of the truck body.

Truck bodies or boxes are available in various designs adapted for particular purposes. One such common body type is a side dump body that is quite commonly used for hauling sugar beets, silage, and the like. Such side pump bodies are typically equipped with a lateral side wall that opens to dump its contents out the side of the body. A truck with this type of body or "beet box" is usually also equipped with a side lift hoist adapted to lift one side of the body so that the contents of the body gravity flow to the lower side. The openable side wall of the body is on the lower side when the hoist is raised, and it is pivotally attached at its bottom to the body floor so that it can be opened by folding it outwardly and downwardly to allow the contents of the body to flow out.

While the preferred use for such truck bodies is generally for hauling sugar beets, silage, and like commodities, it is not uncommon for the owners of trucks equipped with such bodies to also use them to haul other commodities such as small grains. Due to the common use of elevators, augers and the like, for transferring small grains to storage bins, it is not practical or desirable to unload small grains from the truck body by opening the entire side wall as is done when unloading sugar beets or the like. Therefore, such truck bodies or "beet boxes" are also commonly provided with one or more small grain gates in the foldable side wall of the body to accommodate emptying small grains from the body in a smaller more controlled stream of flow.

It is often desirable, however, when emptying small grains to use an additional grain chute attached to the side of the body under the grain gate to assist in further controlling and directing the stream of grain flowing from the body into an elevator or auger hopper, although it is somewhat undesirable to have such a grain chute permanently or even semi-permanently attached to the side of the body because it protrudes outwardly beyond the normal width of the truck body. Such an outward protrusion beyond the side of the truck body is an undesirable obstacle that constitutes a potential safety hazard and could even be illegal in some instances. Therefore, it is desirable to have a portable grain chute which is easily attachable to the side of the truck body while it is being emptied of small grain contents, yet which is easily detachable or removable as soon as the emptying operations are complete. Further, since the body is often emptied many times per day, particularly during harvest season when small grains are being hauled and unloaded continuously and when time is usually at a premium, the attachment and removal of the grain chute to and from the truck box must be simple, quick, and convenient, yet secure and stable during use. Until the development of the present invention, such a grain chute with all of the desirable characteristics has not been available for use on "beet box" type truck bodies.

SUMMARY OF THE INVENTION

Accordingly, it is an object of the present invention to provide a novel and improved portable grain chute device particularly adaptable for use on truck bodies or boxes.

It is also an object of the present invention to provide such a portable grain chute which is simple, quick, and convenient to attach and remove from a truck body or box equipped with a pivotally foldable side wall, yet which is secure and stable during use.

It is another object of the present invention to provide such a grain chute which is a self-contained unit that includes an integral unitary attachment member for removably attaching the chute to the pivotally foldable side of a truck beet box and which does not require or include any additional brackets or other holding means affixed on the side of the truck box for support.

The grain chute of the present invention is comprised of an inclined channel for directing a stream of flowing grain with a novel unitary attachment member integral with and extending from an end of the channel particularly adapted for removable attachment to the side of a truck body or box that is equipped with a pivotally foldable hinged side wall. The attachment member includes an extension of the bottom portion of the grain chute channel which terminates in an upwardly turned lip sized and proportioned to wedge between and engage the truck body frame and the pivotal hinge mounting on the bottom of the side wall of the truck body in a manner which utilizes the weight of the chute to support itself in its use position.

BRIEF DESCRIPTION OF THE DRAWINGS

Other objects, advantages, and capabilities of the present invention will become more apparent as the description proceeds taken in conjunction with the accompanying drawings, in which:

FIG. 1 is a perspective view of a truck equipped with a side dump truck body or box which includes a pivotally foldable side wall and showing the grain chute of the present invention attached in its use position thereon;

FIG. 2 is a perspective view of the grain chute of the present invention;

FIG. 3 is a plan view of the grain chute of the present invention;

FIG. 4 is a front elevation view of the grain chute of the present invention shown attached in its use position on the side of the truck body; and FIG. 5 is a side elevation of the grain chute of the present invention shown attached to the truck body, the truck body being shown in section along line 5—5 of FIG. 4 and the broken lines indicate the position of the grain chute as it is being moved into position for attachment to the truck body.

DESCRIPTION OF THE PREFERRED EMBODIMENT

The grain chute 10 of the present invention is shown in FIG. 1 mounted on the side of a truck body in its use position. Since the grain chute 10 of the present invention is particularly adapted for releasable attachment to the side of truck bodies having particular features, a description of such a typical truck body is appropriate preliminary to the complete description of the invention. A truck T is shown in FIG. 1 equipped with a truck body or box 60 and a side lift hoist which is adapted to lift or raise one side of the truck body 60 to dump its contents. The truck body or box 60 in FIG. 1 is shown in partially raised position. The truck body 60 is also equipped with a pivotally foldable side wall 66 which allows opening of the entire side of the truck body 60 by folding the side wall 66 outwardly and downwardly to the position shown in broken lines in FIG. 1 to allow the contents of the truck body, such as sugar beets, silage, and the like, to flow out when the hoist is raised.

The details of a typical truck body of this type are best shown for the purposes of this invention in FIG. 5 in conjunction with FIGS. 1 and 4. The truck body floor 62 is surrounded on its perimeter by a frame 64. The side wall 66 of the truck body 60 is attached to the frame 64 by a pivotal bracket 70. The pivotal bracket 70 includes an elongated plate 72 affixed to the frame 74 along the length of the truck body and extending laterally outwardly therefrom with an elongated shaft or pipe 74 affixed to the outer edge of the plate 72 a spaced distance outwardly from the frame 64 along the length of the truck body 60. The pipe 74 is affixed to the underside of the lateral edge of plate 72 such that it protrudes downwardly therefrom a short distance. A side wall 66 is normally positioned over the pipe 74 and pivotally mounted in that position by a yoke bracket 76 wrapped around the pipe 74 with legs 78, 80 extending upwardly along the inside and outside, respectively, of the side wall 66 and affixed to the side wall 66 by appropriate fasteners 79, such as bolts or rivets. The side wall 66 is therefore pivotal outwardly and downwardly as the yoke 76 is rotatable about the pipe 74 when the side wall 66 is folded open or closed.

While it is convenient to open the entire side wall 66 of a truck body 60 for dumping some kinds of commodities, such as sugar beets, silage, and the like, it is usually not a desirable means of dumping small grains from the truck body 60. Therefore, grain gates 68 are typically provided at the lower edge of the side wall 66 and are adapted to open and close a smaller hole in the side wall to allow small grains to flow out of the truck body in smaller streams. A grain gate 68 is shown in FIG. 4 and is slidable up and down in guides 69 on the outside surface of the side wall 66.

With the above description of the truck body 60 as background information, the detailed description of the grain chute 10 of the present invention now proceeds. The grain chute 10 is essentially in the form of a channel having a planar bottom panel 12 with right and left side panels 20, 30 extending upwardly from the right and left edges 16, 18, respectively, of the bottom panel 12. The ends 26, 36 of side panels 20, 30 respectively, define the inlet opening to the channel, and the opposite ends 24, 34 of side panels 20, 30, respectively, define the outlet opening of the channel.

A significant feature of the present invention is the integral unitary attachment member 40 which is adapted for removably attaching the grain chute 10 to the side of the truck body 60. The attachment member 40 includes a rigid extension 42 of the planar bottom panel 12 that protrudes outwardly beyond the inlet opening a distance slightly more than the diameter of the pipe 74 on the truck body 60, and it terminates in a rigidly upwardly protruding lip 44, which protrudes upwardly a length greater than the distance between the frame 64 and the pipe 74. As best seen in FIG. 5, the grain chute 10 is attached to the box 60 by positioning the attachment member 40 under the pipe 74 and moving it upwardly such that the lip 44 is between the frame 64 and the pipe 74 with the pipe 74 between the lip 44 and the ends 26, 36 of side panels 20, 30, respectively.

The chute is then rotated to an inclined position until the base 46 of lip 44 abuts against the frame 64 and the distal end 48 of the lip 44 abuts against the pipe 74. In this position, the base 46 of the lip 44 acts as a fulcrum, and the weight of the chute 10 extending outwardly of the box tends to rotate the chute about the fulcrum or base 46 of the lip 44 and forces the distal end 48 of lip 44 into binding engagement with the pipe 74 to retain the chute 10 in this inclined position attached to the side of the truck body 60. Of course, the chute 10 can be removed from the side of the truck body 60 by simply lifting the chute 10 upwardly to rotate the distal end 48 of lip 44 away from pipe 74 and then lowering the chute downwardly and away from the pipe 74. The binding engagement of the lip 44 caused by the weight of the outwardly protruding chute is sufficient to hold the chute in its use position. Further, the security of the attachment of the chute 10 to the truck body 66 is enhanced by grain flowing through the chute 10 due to the increased weight of the grain in the chute 10 acting on the lip 44 to correspondingly increase the binding force of the lip 44 on the pipe 74 and fram 64.

The ends 26, 36 of side panels 20, 30, respectively, are approximately parallel to lip 44 so that they clear the side wall 66 when the attachment member 40 is moved into position under the pipe 74, as shown in brokenlines in FIG. 5, yet they remain close enough to the side wall 66 when the chute 10 is in its inclined use position to guide the stream of grain pouring from the truck body 60 as desired. The lateral edges 50, 52 of the attachment member 40 are notched or offset inwardly to avoid interference with the yokes 76 of the pivotal side wall bracket 70.

The unitary rigid attachment member 40 of the present invention which is an integral component of the grain chute 10 can be quickly and easily removably attached to the truck body without any other brackets, chains or other holding means affixed or attached to the truck body for support. As best shown in FIGS. 3 and 4, the chute 10 can be tapered with the bottom panel 12 being wider at the inlet opening than at the outlet opening to concentrate the flow of grain from the gate 68 into a narrower stream.

For purposes of illustration and not limitation, it has been found that an appropriately sized and proportioned grain chute 10 according to the present invention has a channel formed of a bottom panel about 12 inches long, 12 inches wide at the inlet opening, 7 inches wide at the outlet opening, and side panels about 4 inches high. The rigid extension 42 of the attachment member 40 protrudes $1\frac{1}{2}$ inches outward of the inlet opening, and the lip 44 extends upwardly from extension 42 about 1 inch.

While the grain chute 10 of the present invention has been described in conjunction with a grain body 60 having a pivotally opening side wall 66 with a pipe member 74 positioned a spaced distance outwardly from a frame member 64, it can be appreciated that the attachment 40 of the present invention can be utilized equally effectively with any truck body which has a downwardly protruding member under the side wall 66 that is a spaced distance outwardly from the frame 64 or on any other similar structure.

Although the present invention has been described with a certain degree of particularity, it is understood that the present disclosure has been made by way of example, and that changes in details of structure may be made without departing from the spirit thereof.

What is claimed is:

1. A grain chute adapted for removable attachment to a truck box which has a floor, a frame member around the perimeter of the floor extending downwardly from the plane of the floor, side boards mounted on pivotal brackets around the perimeter of said floor, said brackets extending outwardly from the plane of the floor and downwardly a spaced distance from said frame member, and a grain gate in one of said sides over said bracket, said grain chute comprising:

an inclined channel having a planar bottom panel, and two side panels extending upwardly from opposite lateral edges, respectively, of said bottom panel, said channel having an inlet opening at its higher end between the edges of said side panels at the higher ends thereof, an outlet opening at its lower end between the edges of said side panels at the lower ends thereof, and an attachment member extending rigidly outwardly from said channel in the plane of said bottom panel and terminating in a rigid upwardly extending lip having an upwardly extending length exceeding the distance between said frame member and said bracket, and said attachment member being adapted to receive the downward extension of said bracket between said inlet opening and said lip with said lip protruding upwardly between said frame member and said bracket with its distal end abutting against said bracket, the base end of said lip acting as a fulcrum about which the weight of said channel tends to rotate said attachment member thereby forcing the distal end of said lip into binding engagement against said bracket and said frame to support said chute in position under the grain gate.

2. The grain chute of claim 1, wherein said lip extends upwardly substantially perpendicular to the plane of said bottom panel and the edges of said side panels at the inlet opening are approximately parallel to said lip.

* * * * *